(No Model.) 4 Sheets—Sheet 1.
C. S. BRADLEY.
ARMATURE FOR DYNAMO ELECTRIC MACHINES AND ELECTRIC MOTORS.
No. 486,078. Patented Nov. 15, 1892.
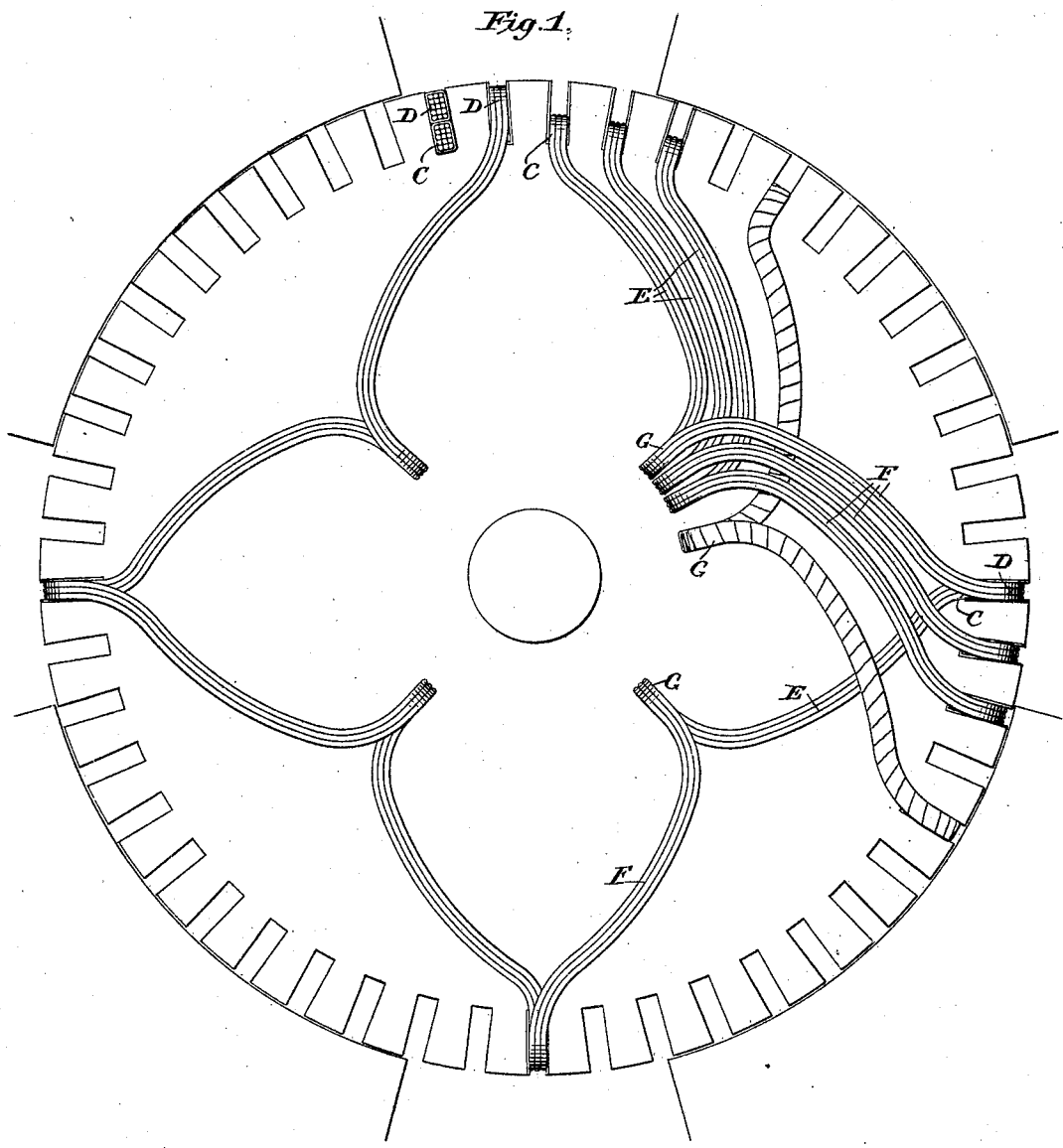
Witnesses
Geo. W. Breck.
Henry W. Lloyd.
Inventor
Chas. S. Bradley
By his Attorney
Chas. G. Curtis (No Model.) 4 Sheets—Sheet 2.
C. S. BRADLEY.
ARMATURE FOR DYNAMO ELECTRIC MACHINES AND ELECTRIC MOTORS.
No. 486,078. Patented Nov. 15, 1892.
*Fig. 2,*
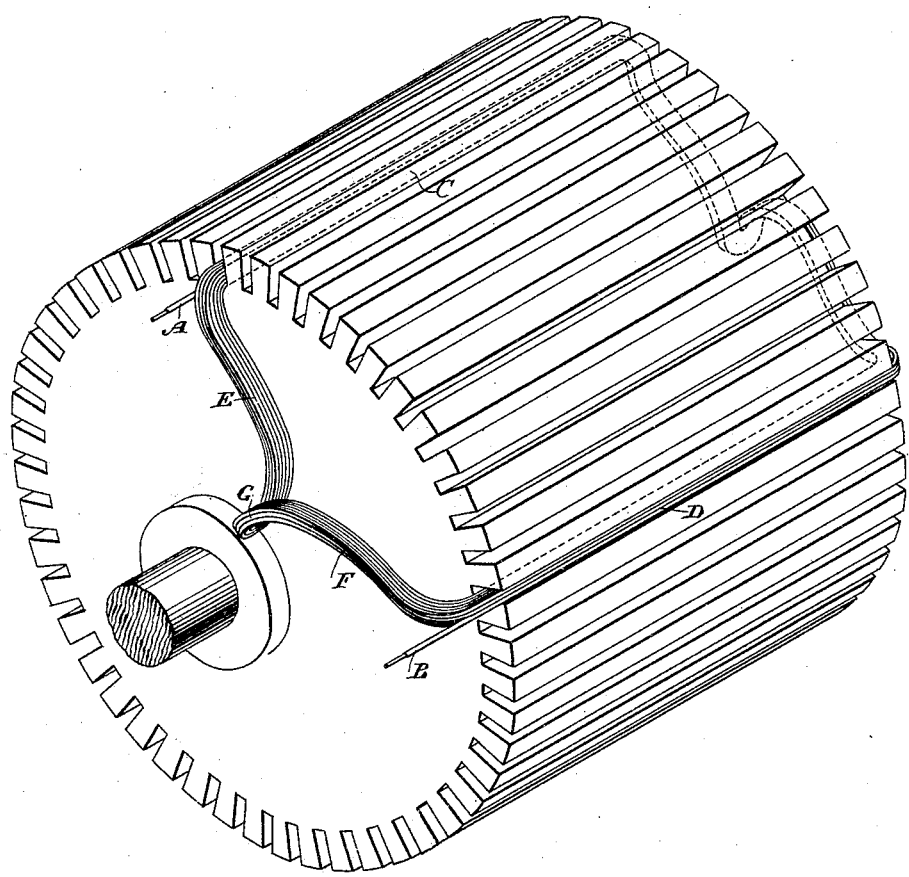
Witnesses
Geo. W. Breck
Henry W. Lloyd.
Inventor
Chas. S. Bradley
By his Attorney
Chas. G. Curtis

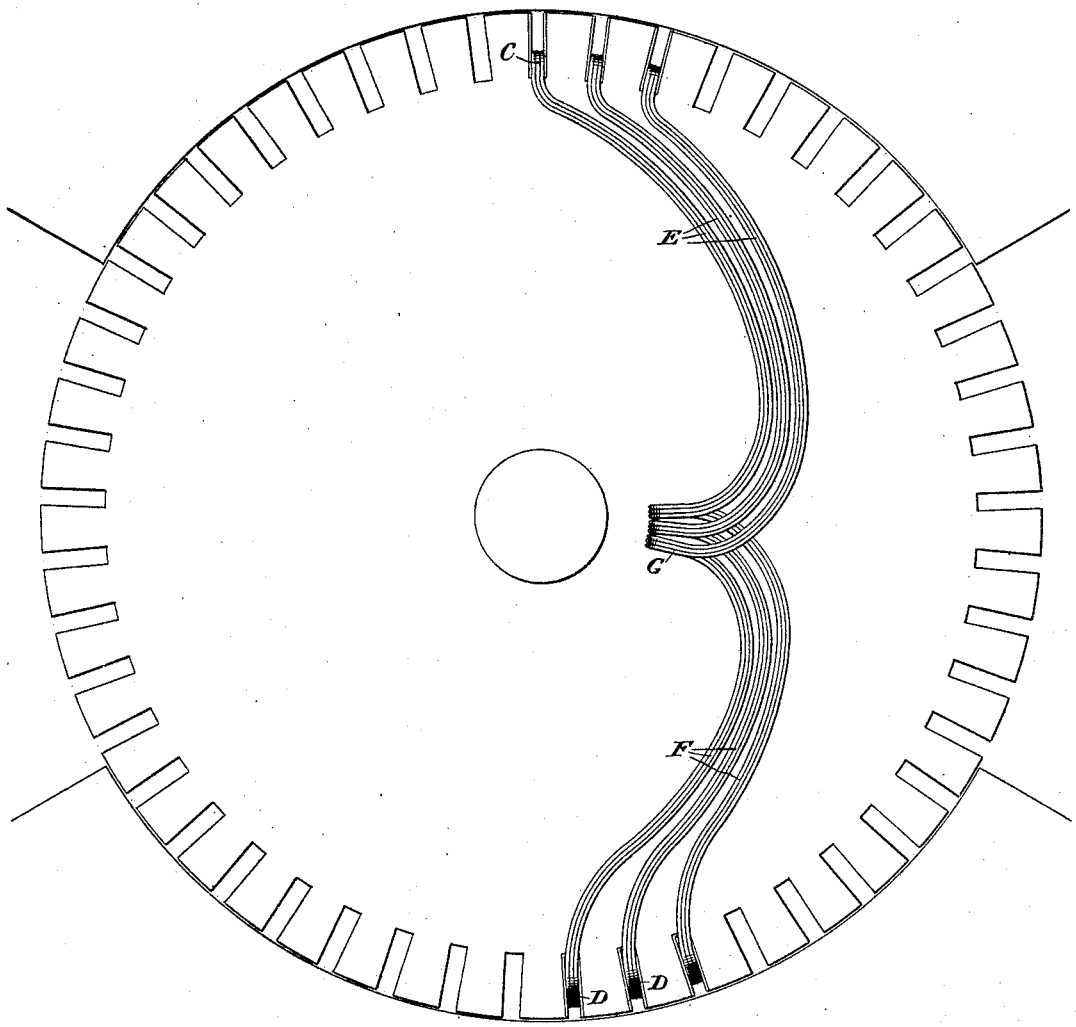

(No Model.) 4 Sheets—Sheet 4.
C. S. BRADLEY.
ARMATURE FOR DYNAMO ELECTRIC MACHINES AND ELECTRIC MOTORS.
No. 486,078. Patented Nov. 15, 1892.
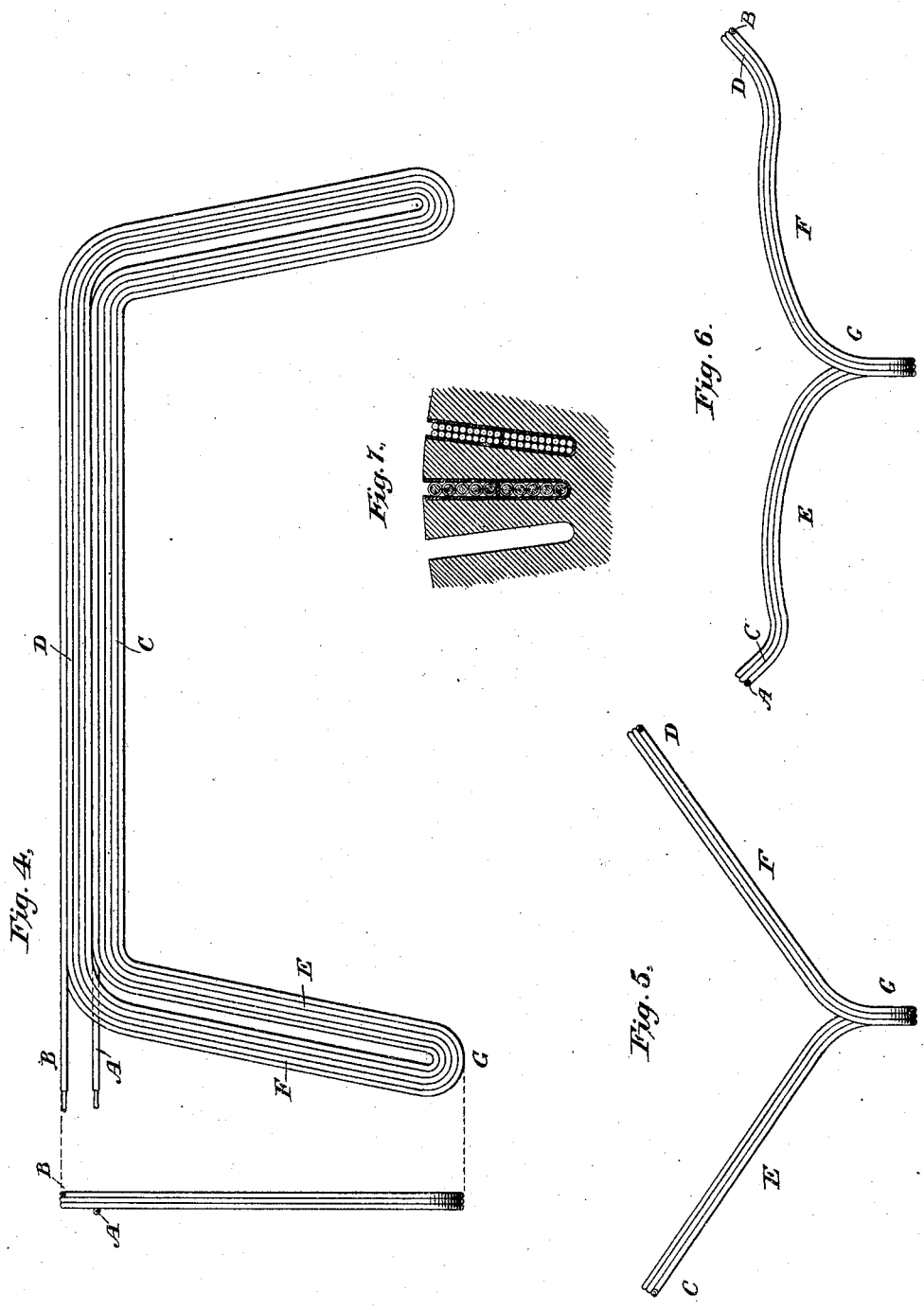

UNITED STATES PATENT OFFICE.

CHARLES S. BRADLEY, OF NEW YORK, N. Y.

ARMATURE FOR DYNAMO-ELECTRIC MACHINES AND ELECTRIC MOTORS.

SPECIFICATION forming part of Letters Patent No. 486,078, dated November 15, 1892.

Application filed November 17, 1890. Serial No. 371,728. (No model.)

*To all whom it may concern:*

Be it known that I, CHARLES S. BRADLEY, of New York, N. Y., have invented certain new and useful Improvements in Armatures for Dynamo-Electric Machines and Electric Motors and Methods of Applying the Winding Thereto, of which the following is a specification.

The object of my invention is to provide a form of armature-winding and a mode of applying the wire or winding to armatures of the drum type in which the many objections to the ordinary form of Siemens winding are obviated.

Prior to my invention the winding of armatures of the drum form had been done on the well-known Siemens plan, though many attempts have been made to devise a better plan of winding.

One of the principal advantages of my improved method of winding is that it entirely avoids the crossing of the wires or the crossing of the coils of sections of the winding at the ends of the armature and renders it practically impossible for any two wires or parts of the conductor which should be kept insulated from each other to cross or lie in contact at an angle or in any position except one of parallelism. I am thus enabled to avoid one of the most serious difficulties in the ordinary Siemens winding, due to the pressing and rubbing of one wire upon another one which crosses it, and the consequent short-circuiting and heating effect produced, and thus to render it practically impossible to have any short circuits in such an armature and to burn it out by a slight but prolonged excess of current, as is the case in the ordinary Siemens machine.

Another object of my invention is to enable the winding to be done much more readily and cheaply and to enable the winding or the separate sections or coils of the winding to be formed and applied in such a way that one or more of the sections may readily be removed and replaced without the necessity of reconstructing the entire armature-winding.

Another object is to enable the separate sections or the coils of the winding to be made perfectly similar in form and therefore of equal length and equal resistance.

In Letters Patent of the United States No. 394,818, issued to me December 18, 1888, I have described a general principle or mode of constructing the armature conductors or winding for drum-armatures, as applied to armatures formed with bar-conductors, in which these difficulties are entirely overcome by giving to the conductors or connecting portions of the conductors at the ends of the armature certain peculiar shapes.

My present invention consists in the application of the same general principle to an armature provided with a wire or continuous conductor formed into coils having a uniform cross-section throughout.

I will now describe my invention by reference to the accompanying drawings.

Figure 1 represents an end view of an armature-core provided with my improved winding, showing part of the coils in place and one of the coils in section. In this case the winding is shown as applied to a four-pole machine. Fig. 2 is a perspective view of the same armature, showing only one of the windings or coils in place. Fig. 3 is an end view of my improved winding, showing it as applied to a two-pole machine. Figs. 4, 5, and 6 show different views of one of the armature-coils and the mode of forming it according to my invention. Fig. 7 shows a similar winding formed of other sizes or forms of wire.

The form of armature to which I prefer to apply my improved winding is the same as that described in the Letters Patent No. 394,818 before referred to, in which the conductors or windings are embedded in narrow deep slots formed in the periphery of the armature-core. Each complete coil or section of the armature-winding consists of two straight portions, one of which fills or occupies the lower half of one slot and the other of which fills the upper half of the corresponding slot under the succeeding pole-piece and two end portions, each of which consists of two curved or spiral legs which stand in different planes, so as to be offset longitudinally with reference to each other and merged together toward the axis of the armature into a portion parallel in direction to the shaft, as can clearly be seen from Figs. 1 and 2. The mode in which I form these coils or sections is clearly shown in Figs. 4, 5, and 6. I take the continuous wire of which the winding is to be formed, which may be of course of any desired size or shape of wire and which may be the ordinary cotton-covered wire or any wire specially prepared for the purpose, and beginning with one end at A, Fig. 4, which ultimately forms one of the ends to be connected with the commutator, I lay it in the general shape and so as to form the plain figure shown in Fig. 4, following the course, as shown in Fig. 4, until enough strands are grouped together to form the coil having the desired number of wires and having the proper cross-section, the wire going out at B, which forms the other terminal, to connect with the commutator. In this case each coil or section is composed of fifteen convolutions or turns grouped five feet deep and three in width, giving the requisite cross-section to fill one-half of the slots in the armature-core. The flat coil thus formed I then place in suitable forming holders or apparatus and bend it to the general shape shown in Fig. 5, Fig. 5 being an end view of the coil. By means of suitable bending apparatus the coil is then further bent to the shape shown in Fig. 6, the straight part C forming the portion of the coil which fits in the lower part of one of the slots, and the part D forming the part which fits into the upper part of the corresponding slot, and the portions E and F forming the curved connecting portions which stand in different planes and merge toward the center into the parts G, in which the course of the wires or conductors is in the general direction of the armature-axis. The coil thus formed is then applied to the armature by simply springing the two straight portions into the proper slots, and this is done with all the coils in succession until the coils of the last quarter are being placed in position, when the ends of the coils first laid have to be lifted up in order to get the last coils in under them. The group of wires forming each coil may be secured together in any desired way by sticking them together with shellac, for example, which may be done after the coil is first wound, as shown in Fig. 4, and before bending it to the required shape to apply to the armature, or the group of wires may be bound together with tape or in any other desired way, as shown in the case of one of the coils in Fig. 1.

The grouping of the wires in each coil may be made different in the portions at the end of the drum from what it is in the straight portions which lie in the slots, if it should be desirable for any reason; but one of the great advantages of my improved winding is that the grouping of the coils or wires constituting each coil remains the same throughout the length of the coil at the end portions of the coils as well as the straight portions, and consequently the cross-section of the coil is uniform in shape and the parallelism of the wires or conductors is perfectly preserved. This I am enabled to do to great advantage by constructing the armature on the slotted-core principle, the coils being placed in narrow deep slots instead of upon the exterior of the drum, as in the ordinary machine. As there is considerable space between the adjacent coils, (this space generally exceeding considerably and perhaps several times the thickness of the coil,) there still remains sufficient room circumferentially for all the coils in the smaller circle which the coils necessarily occupy where they merge toward the center in order to enable the separate portions to pass by one another. Theoretically if the distance apart of the coils or distance between the adjacent slots were just equal to the thickness of each coil the portions G of the coils could reach inward half-way to the axis of the armature and still leave sufficient room, whereas if the space between the adjoining coils be greater or several times as great as the thickness of each coil, as it should be for other reasons, the portions G of the coils may be brought in as near to the center as desired and there will still be sufficient space between them to enable work to be done practically and neatly. By constructing the armature-winding in this way it will be observed that the cross-section or grouping of the wires in each coil is kept the same throughout all portions and the parallelism is perfectly preserved, so that no crossing of wires upon one another is possible, and only those wires between which the difference of potential is small are allowed to come in contact or bear upon one another. The only places where the wires stand at an angle to each other and there is any possibility of a cross or short circuit is where the outer portions F of the coils cross or pass over the inner portions E, and as these portions are in different planes they may be separated by a considerable space, and the coils when made may be wrapped or covered with any desired thickness of insulating material, and it may easily be made absolutely impossible for a cross or leak to occur at any of these points. The coils being precisely similar in shape and alike in every respect are necessarily exactly equal in resistance and exactly equal in weight, and as they are applied to the armature symmetrically they produce an armature which is not only symmetrical electrically, but symmetrical mechanically—that is, with its center of gravity coincident with the armature-axis. These coils may be rapidly and easily made and may be applied to the armature easily and quickly and without requiring the highly-skilled labor necessary to properly construct a good Siemens winding. Besides this, if one of the coils becomes injured in any way it may be taken out and replaced without the necessity of reconstructing the entire armature.

In Fig. 4 the portions E F, which merge toward the center of the armature, are shown as brought in somewhat obliquely instead of straight toward the center, so as to provide for the end plates which clamp the thin laminæ or disks forming the armature-core together; but of course they may be brought in at right angles to the axis or given any other desired shape.

The general principle or scheme of the armature connections if the machine be a multipolar machine, which I prefer to employ, is that described in Letters Patent to H. Muller, No. 331,726, dated December 1, 1885; but as that only relates to the mode of connection of the separate coils and not to the mode of forming or arranging the armature coils or sections it is not necessary that it should be fully described here.

In Fig. 7 I have shown coils formed of other sizes of wire; but it is of course evident that a wire or conductor of any desired shape and size may be employed by bending it at the ends of the armature so as to follow the same general course or principle of offsetting the conductor as that shown in the drawings, so as to enable the several coils to pass and be put in place and fitted into one another.

My invention is also applicable to the ordinary two-pole machine, as shown in Fig. 3, though in such a case, where the coils have to cross the armature diametrically, they become crowded and it is difficult to get them in place without changing their shape or cross-section, unless the coils be very narrow.

My invention is not limited to exactly such a plan of arranging the coils in the slots as I have shown in the figures, in which part of one coil occupies the bottom and part of another coil occupies the top of each slot, as other modes of arranging the coils or portions of the coils in the slots may be employed, if desirable.

What I claim as my invention, and desire to secure by Letters Patent, is—

1. A drum-armature having a core provided with slots or grooves in its face, in combination with coils fitting therein, the individual strands or windings of each coil preserving substantial parallelism throughout and all held in place by the slots and their own mutual binding action, substantially as described.

2. A drum-armature having a slotted core and a series of coils fitted in the slots, the individual strands or windings of the coils having substantial parallelism throughout, one side of each coil lying beneath the opposite side of the next coil in sequence, so that all are bound together, substantially as described.

3. A drum-armature having a slotted core and a series of coils the individual strands or windings of which preserve substantial parallelism throughout, each coil being wrapped or surrounded with an insulating medium which insulates the entire coil from all parts of the core and the other coils, one side of each coil lying beneath the opposite side of the next coil in sequence, substantially as described.

4. An armature having a slotted core of the cylindrical type provided with two or more coils the individual strands or windings of which preserve substantial parallelism in each coil throughout the length thereof, said coils being located in the aforesaid slots and held in place by the walls thereof and their own mutual binding action, substantially as described.

5. An armature having two or more coils located beneath the face of the core, one side of each coil overlapping one side of the next coil in sequence, whereby they are all held in place, substantially as described.

6. In an armature, two or more coils located beneath the face of the core and overlapping each other in sequence, whereby they are made detachable, substantially as described.

7. An armature having two or more coils buried in the face of the core, each coil overlapping another and all held together by the core and their own mutual binding action, substantially as described.

8. A slotted armature having two or more detachable coils sprung in place in the slots and overlapping each other, whereby they are securely held, substantially as described.

CHARLES S. BRADLEY.

Witnesses:
D. A. FARRINGTON,
W. R. KIMBALL.